(12) United States Patent
Norman (10) Patent No.: US 10,295,979 B2
(45) Date of Patent: May 21, 2019

(54) SCHEDULING IN MANUFACTURING ENVIRONMENTS (71) Applicant: Applied Materials, Inc., Santa Clara, CA (US)

(72) Inventor: David Everton Norman, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 262 days.

(21) Appl. No.: 15/265,364

(22) Filed: Sep. 14, 2016

(65) Prior Publication Data

US 2017/0075332 A1   Mar. 16, 2017

Related U.S. Application Data (60) Provisional application No. 62/219,120, filed on Sep. 15, 2015.

(51) Int. Cl.
| | |
|---|---|
| *G06F 19/00* | (2018.01) |
| *G05B 19/042* | (2006.01) |
| *G05B 23/02* | (2006.01) |
| *G06F 9/50* | (2006.01) |
| *G05B 19/418* | (2006.01) |

(52) U.S. Cl.
CPC ... *G05B 19/0426* (2013.01); *G05B 19/41865* (2013.01); *G05B 23/0272* (2013.01); *G06F 9/5027* (2013.01); *G05B 2219/32266* (2013.01); *G05B 2219/45031* (2013.01); *Y02P 90/20* (2015.11)

(58) Field of Classification Search
CPC .......... G05B 19/0426; G05B 19/41865; G05B 23/0272; G05B 2219/45031; G05B 2219/32266; G06F 9/5027; Y02P 90/20
See application file for complete search history.

(56) References Cited

U.S. PATENT DOCUMENTS

| 5,442,561 | A | * | 8/1995 | Yoshizawa | ....... G05B 19/41865 700/100 |
| 5,706,200 | A | * | 1/1998 | Kumar | ............. G05B 19/41865 700/100 |
| 5,801,945 | A | * | 9/1998 | Comer | ............. G05B 19/41865 700/100 |
| 5,820,679 | A | * | 10/1998 | Yokoyama | ............ C23C 14/568 118/719 |

(Continued)

*Primary Examiner* — Adam Lee
(74) *Attorney, Agent, or Firm* — Patteson + Sheridan, LLP (57) ABSTRACT

Embodiments presented herein provide techniques for executing a block-based workflow to provide a schedule for a semiconductor manufacturing environment. The block-based workflow includes a plurality of blocks and each block specifies a set of operations to be performed upon execution of each block. One embodiment includes extracting scheduling data from the semiconductor manufacturing environment, determining an allocation of the number of lots to one or more devices operating in the semiconductor manufacturing environment, determining an order in which the lots should be processed by the one or more devices and publishing results of the allocation and processing order to at least one another device in the semiconductor manufacturing environment, based on the plurality of blocks in the block-based workflow.

26 Claims, 7 Drawing Sheets (56) References Cited

U.S. PATENT DOCUMENTS

| | | | | |
|---|---|---|---|---|
| 5,928,389 A * | 7/1999 | Jevtic | ............... | G05B 19/41865 29/25.01 |
| 6,128,588 A * | 10/2000 | Chacon | .................. | G03F 7/705 703/6 |
| 6,201,999 B1 * | 3/2001 | Jevtic | ................. | G03F 7/70533 118/719 |
| 6,243,612 B1 * | 6/2001 | Rippenhagen | ... | G05B 19/41865 700/100 |
| 6,418,350 B1 * | 7/2002 | Hamidzadeh | .... | G05B 19/41865 700/100 |
| 6,429,783 B1 * | 8/2002 | Reyes | ...................... | G08B 5/36 340/468 |
| 6,438,436 B1 * | 8/2002 | Hohkibara | ............. | G06Q 10/06 700/97 |
| 6,490,494 B1 * | 12/2002 | Yasuda | .................. | G06Q 10/06 700/100 |
| 6,594,536 B1 * | 7/2003 | Lin | .................. | G05B 19/41865 438/907 |
| 6,622,057 B1 * | 9/2003 | Ko | .................. | G05B 19/41815 700/112 |
| 6,748,287 B1 * | 6/2004 | Hagen | ..................... | G06Q 10/06 700/100 |
| 6,763,277 B1 * | 7/2004 | Allen, Jr. | ......... | G05B 19/41865 700/100 |
| 6,941,183 B1 * | 9/2005 | Huang | ............. | G05B 19/41865 700/101 |
| 6,978,187 B1 * | 12/2005 | Ryskoski | ......... | G05B 19/41865 700/100 |
| 7,043,322 B1 * | 5/2006 | Denton | .................. | G06Q 10/04 700/100 |
| 7,236,843 B1 * | 6/2007 | Wizelman | ........ | G05B 19/41865 700/100 |
| 7,257,502 B1 * | 8/2007 | Qu | .......................... | G03F 7/705 438/7 |
| 7,296,103 B1 * | 11/2007 | Purdy | ............... | G05B 19/41865 710/106 |
| 7,337,032 B1 * | 2/2008 | Nettles | ............. | G05B 19/41865 700/100 |
| 7,720,559 B1 * | 5/2010 | Stewart | ............... | G05B 19/4187 700/101 |
| 7,966,089 B1 * | 6/2011 | Krishnaswamy | .. | G05B 19/4183 700/101 |
| 9,223,307 B1 * | 12/2015 | Wu | .......................... | B25J 9/009 |
| 2002/0103563 A1 * | 8/2002 | Izawa | ............. | G05B 19/41875 700/121 |
| 2002/0123818 A1 * | 9/2002 | Yamada | ............. | H01L 21/67276 700/121 |
| 2002/0124000 A1 * | 9/2002 | Ooishi | ............. | G06F 17/30575 |
| 2002/0192055 A1 * | 12/2002 | Kobayachi | ............. | G06Q 10/04 414/200 |
| 2003/0010091 A1 * | 1/2003 | Mitchell | ............. | C23C 16/4408 73/37 |
| 2003/0034506 A1 * | 2/2003 | Pandya | ............... | H01L 21/8258 257/201 |
| 2003/0056189 A1 * | 3/2003 | Miyazaki | .................. | G03F 1/00 716/50 |
| 2003/0065415 A1 * | 4/2003 | Hegde | .................... | G06Q 10/06 700/100 |
| 2003/0153995 A1 * | 8/2003 | Karasawa | ........ | G05B 19/41865 700/101 |
| 2003/0158618 A1 * | 8/2003 | Browning | ........ | G05B 19/41865 700/99 |
| 2003/0225474 A1 * | 12/2003 | Mata | ................. | G05B 19/41865 700/121 |
| 2004/0040001 A1 * | 2/2004 | Miller | ..................... | H01L 22/20 438/10 |
| 2004/0088068 A1 * | 5/2004 | Kadosh | ............ | G05B 19/41875 700/108 |
| 2005/0096770 A1 * | 5/2005 | Chua | ................. | G05B 19/41865 700/102 |
| 2005/0203655 A1 * | 9/2005 | Tsai | .................. | G05B 19/41865 700/101 |
| 2005/0283265 A1 * | 12/2005 | Denton | ................... | G06Q 10/06 700/103 |
| 2006/0259198 A1 * | 11/2006 | Brcka | ............ | G05B 19/4184 700/246 |
| 2007/0020782 A1 * | 1/2007 | Rathei | ................ | G05B 23/0232 438/14 |
| 2007/0111478 A1 * | 5/2007 | Komura | ............ | B23K 26/0057 438/462 |
| 2007/0225848 A1 * | 9/2007 | Chang | ..................... | G06Q 10/04 700/101 |
| 2007/0239303 A1 * | 10/2007 | Burda | ..................... | G06Q 10/06 700/101 |
| 2008/0051929 A1 * | 2/2008 | Hongkham | ........ | H01L 21/67276 700/214 |
| 2008/0125900 A1 * | 5/2008 | Maxim | ............. | G06Q 10/08 700/113 |
| 2008/0286885 A1 * | 11/2008 | Izikson | .................. | G05B 21/02 438/7 |
| 2009/0119669 A1 * | 5/2009 | Norman | .................. | G06Q 10/06 718/102 |
| 2009/0149979 A1 * | 6/2009 | McGahay | ............. | G06Q 10/06 700/101 |
| 2011/0060441 A1 * | 3/2011 | Ko | .......................... | G05B 17/02 700/101 |
| 2011/0112676 A1 * | 5/2011 | Izumi | ................. | G05B 19/41865 700/101 |
| 2011/0208337 A1 * | 8/2011 | Norman | .................. | G06Q 10/06 700/97 |
| 2014/0148924 A1 * | 5/2014 | Brak | ..................... | G05B 19/02 700/12 |
| 2014/0277667 A1 * | 9/2014 | Norman | ........... | G05B 19/41865 700/100 |
| 2014/0277668 A1 * | 9/2014 | Oza | ................. | G05B 19/41865 700/101 |
| 2014/0316548 A1 * | 10/2014 | Parente | ............ | G05B 19/41865 700/101 |
| 2014/0365265 A1 * | 12/2014 | Zhao | ................. | G06Q 10/06316 705/7.26 |
| 2016/0126120 A1 * | 5/2016 | Oza | ..................... | G05B 19/4189 700/121 |
| 2016/0147219 A1 * | 5/2016 | Siddiqui | .......... | G05B 19/41865 700/101 |
| 2016/0322512 A1 * | 11/2016 | Nagase | ............. | H01L 21/67126 |

* cited by examiner

SCHEDULING IN MANUFACTURING ENVIRONMENTS

CROSS-REFERENCE TO RELATED APPLICATION

This application claims benefit of United States Provisional Patent Application Ser. No. 62/219,120, filed on Sep. 15, 2015, and titled "SCHEDULING IN MANUFACTURING ENVIRONMENTS," which is incorporated by reference herein in its entirety.

BACKGROUND

Field

Embodiments of the present disclosure generally relate to scheduling, and more particularly to techniques for generating schedules to manage production processes within a manufacturing environment, using block-based workflows.

Description of the Related Art

Manufacturing facilities across many different industries are responsible for producing products that are used in every facet of life. In the case of semiconductor manufacturing, for example, semiconductor manufacturing facilities manufacture products such as, microprocessors, memory chips, microcontrollers, and other semiconductor devices that have a ubiquitous presence in everyday life. These semiconductor devices are used in a wide variety of applications, examples of which include automobiles, computers, home appliances, cellular phones, and many others. Further, in recent years, both the number of applications and demand for devices (including semiconductor devices) has steadily increased. This increased demand has led manufacturing facilities to become increasingly conscious of increasing product variety and reducing delivery times.

Each manufacturing environment is unique and extremely complex, often requiring immense amounts of capital for the necessary equipment, tools, facilities, etc. Because manufacturing is so capital intensive, even small increases in factory performance (e.g., such as building to demand, shortening order to delivery time, etc.) can have large effects on financial performance (e.g., by reducing cost through leaner manufacturing, freeing up capital tied to idle inventory, etc.). For this reason, many manufacturing facilities have recently become interested in implementing scheduling systems in their facilities to manage the complexity, provide high-quality, on-time deliveries, etc.

Today, manufacturing facilities generally build and implement custom-built scheduling systems or purchase commercial scheduling systems to schedule all or part of the equipment in their facility. Custom built scheduling systems, however, are difficult to maintain and inflexible, which makes it difficult to make modifications to the scheduling system. In many cases, for example, the manufacturing facility may undergo changes to account for new applications, tool improvements, etc. With custom-built scheduling systems, however, adapting to such changes can require a level of technical expertise that may not be available to the manufacturing facility (e.g., an end user may not have coding experience, etc.), require a significant time commitment, substantial costs (e.g., due to the complexity of the facility), etc. Further, commercial scheduling systems are generally closed, black-box solutions that do not allow customization by an end user. In these cases, modifying the scheduling system is simply not possible without paying the commercial vendor (e.g., to modify the commercial scheduling system, design a new commercial scheduling system, etc.), which can be very cost-prohibitive and time-consuming. In addition, traditional scheduling systems (e.g., custom-built scheduling systems, commercial scheduling systems, etc.) generally are not capable of evaluating the quality of a generated schedule and/or troubleshooting the system in the case of a problem. As a result, identifying potential problems in a particular schedule and/or modifying the schedule can require immense amounts of time, other expensive solutions, etc., all of which can impact the manufacturing facility's ability to meet the increasing demand for products.

SUMMARY

Embodiments disclosed herein include methods, systems, and computer program products for generating a schedule to manage a production process within a semiconductor manufacturing environment using block-based (BB) workflows. In one embodiment, a method for executing a BB workflow to provide a schedule for a semiconductor manufacturing environment is disclosed. The method includes receiving at least one BB workflow that includes a plurality of blocks. The plurality of blocks specify a set of operations for generating the schedule for the semiconductor manufacturing environment. The method also includes accessing a plurality of block definitions corresponding to the plurality of blocks, and executing the at least one BB workflow by performing the set of operations based on the plurality of block definitions. Executing the at least one BB workflow includes extracting data from a semiconductor manufacturing environment that describes a number of lots available for processing and one or more devices operating in the semiconductor manufacturing environment. Each lot includes a plurality of semiconductor wafers or a plurality of semiconductor die. Executing the at least one BB workflow also includes determining, based on the extracted data, an allocation of the number of lots to the one or more devices operating in the semiconductor manufacturing environment, and an order in which the lots should be processed by the one or more devices. Executing the at least one BB workflow further includes publishing the determined allocation and processing order to at least one another device in the semiconductor manufacturing environment.

Another embodiment provides a non-transitory computer-readable medium containing computer program code that, when executed, performs an operation for executing a BB workflow to provide a schedule for a semiconductor manufacturing environment. The operation includes receiving at least one BB workflow that includes a plurality of blocks. The plurality of blocks specify a set of operations for generating the schedule for the semiconductor manufacturing environment. The operation also includes accessing a plurality of block definitions corresponding to the plurality of blocks, and executing the at least one BB workflow by performing the set of operations based on the plurality of block definitions. Executing the at least one BB workflow includes extracting data from a semiconductor manufacturing environment that describes a number of lots available for processing and one or more devices operating in the semiconductor manufacturing environment. Each lot includes a plurality of semiconductor wafers or a plurality of semiconductor die. Executing the at least one BB workflow also includes determining, based on the extracted data, an allocation of the number of lots to the one or more devices operating in the semiconductor manufacturing environment, and an order in which the lots should be processed by the one or more devices. Executing the at least one BB workflow further includes publishing the determined allocation and processing order to at least one another device in the semiconductor manufacturing environment.

Still another embodiment provides a scheduling system for a semiconductor manufacturing environment. The semiconductor manufacturing environment includes a plurality of lots and one or more tools for processing the lots, wherein each lot includes a plurality of semiconductor wafers or a plurality of semiconductor die. The scheduling system includes at least one processor and a memory. The memory stores a computer program that, when executed by the at least one processor, performs an operation for executing a BB workflow to provide a schedule for the manufacturing environment. The operation includes receiving at least one BB workflow that includes a plurality of blocks. The plurality of blocks specify a set of operations for generating the schedule for the manufacturing environment. The operation also includes accessing a plurality of block definitions corresponding to the plurality of blocks, and executing the at least one BB workflow by performing the set of operations based on the plurality of block definitions. Executing the at least one BB workflow includes extracting data from a manufacturing environment that describes a number of the lots available for processing and the tools operating in the manufacturing environment. Each lot includes a plurality of semiconductor wafers or a plurality of semiconductor die. Executing the at least one BB workflow also includes determining, based on the extracted data, an allocation of the number of lots to the tools operating in the manufacturing environment, and an order in which the lots should be processed by the tools. Executing the at least one BB workflow further includes publishing the determined allocation and processing order to at least one device in the manufacturing environment.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, wherever possible, to designate identical elements that are common to the Figures. Additionally, it is contemplated that elements disclosed in one embodiment may be beneficially used in other embodiments described herein without specific recitation.

DETAILED DESCRIPTION

Embodiments presented herein present techniques for generating a schedule to manage all or part of a manufacturing production process, using block-based workflows. The workflows can be used by an end-user to construct a scheduling system that produces a schedule for managing one or more tasks performed within a manufacturing environment and/or controlling one or more devices within the manufacturing environment. For example, each workflow contains an order of a series of operations (e.g., represented by one or more blocks of the workflow) that are performed in order to produce the schedule. Examples of these operations can include retrieving data from different sources, manipulating and transforming the data into different formats, analyzing the data, generating a schedule based on the data, using an external solver to generate the schedule, providing the schedule to multiple outputs, etc. By arranging and/or modifying blocks within the workflow, an end-user (e.g., of a manufacturing environment) can adapt the scheduling system to account for any change to the manufacturing environment, without having specialized programming knowledge or writing complicated scripting and code.

Today, manufacturing facilities have very complex environments in which facilities typically perform several different tasks related to the manufacture of a product. These tasks can include, but are not limited to, tasks for servicing tools (or equipment) within the manufacturing environment, tasks for using manufacturing tools, tasks for changing a tool setup, tasks for inspecting a manufacturing tool, tasks for performing one or more processes on resources (or an unfinished product) in order to manufacture a completed product, etc. In the case of semiconductor manufacturing, the semiconductor manufacturing process is generally divided into two parts, "front-end" and "back-end," both of which use different types of semiconductor manufacturing equipment. Front-end typically refers to wafer fabrication. For example, front-end manufacturing facilities generally start with blank semiconductor wafers (e.g., silicon wafers) and perform various processes, such as photolithography, deposition, etching, cleaning, ion implantation, chemical and mechanical polishing, etc., to fabricate a completed wafer with many semiconductor die on the wafer. Back-end typically refers to the assembly and testing of individual semiconductors. For example, once the front-end production process is completed, the completed wafers are transferred to a back-end manufacturing facility, which typically performs functions such as dicing the completed wafer into individual semiconductor die, testing, assembly, packaging etc. As such, front-end and back-end processes can consist of hundreds of processing steps performed by several different tools or automated devices within the manufacturing environment. To meet the ever increasing demand for manufacturing products, it is becoming increasingly important for manufacturing environments to schedule the series of complex tasks performed within the manufacturing environment and/or control the tools (or groups of tools) and automated devices within the manufacturing environment.

Recently, however, manufacturing facilities are increasingly finding it difficult to use traditional scheduling techniques to schedule production processes within their facilities. In many cases, for example, scheduling systems have to be modified to account for changes in the manufacturing cycle (e.g., a change in the process flow, changes to processing times, different tool groups, new tools introduced, and the like) problems within the manufacturing environment (e.g., tool failures, defects in the output product, maintenance operations, and the like), new incoming orders, changes to orders, etc. Manufacturing facilities, however, are increasingly finding adapting traditional scheduling systems to be inefficient, time consuming and expensive. For example, in the case of custom-built scheduling systems, modifying these systems can involve complicated scripting and code to be written by a user with specialized programming knowledge, involve a significant amount of time, decreased productivity, etc. In addition, in the case of commercial scheduling systems, manufacturing facilities are generally not allowed to modify these systems without paying a commercial vendor additional money to modify the system, design a new system, etc.

As will be described in more detail below, embodiments provide techniques that can be used to create a scheduling system that is open, configurable and extensible by the end user (e.g., of a manufacturing facility) through the use of block-based workflows. For example, an end-user can use the techniques presented herein to extend the workflow (e.g., to include additional steps, etc.), adjust processing order of a workflow, configure (or customize) the set of operations within the workflow, etc., all without the need to understand or write any code. Further, as described below, the techniques presented herein allow manufacturing facilities to evaluate a generated schedule and perform retroactive debugging in the event there are any errors or problems. As such, the scheduling system presented herein provides manufacturing facilities with the ability to quickly adapt to changing circumstances, perform troubleshooting, etc. without requiring specialized programming knowledge, or difficult and time-consuming operations that are associated with legacy scheduling systems.

One embodiment includes a method for executing, by a block-based (BB) scheduling component, at least one BB workflow to provide a schedule that manages some or all of the tasks performed within a manufacturing environment (e.g., front-end or back-end semiconductor facility or factory). Within the manufacturing environment, several tools (or equipment) can be available for processing raw material or a work-in-progress (e.g., unfinished goods) to produce a completed product. For example, in semiconductor manufacturing, one or more tools can be used to process one or more lots during front-end processing, back-end processing, etc. For front-end, the one or more lots generally refer to one or more blank semiconductor wafers. For back-end, the one or more lots generally refer to one or more semiconductor die (e.g., on completed semiconductor wafers). In one embodiment, the BB scheduling component provides a schedule that specifies what pieces of equipment (or tools) should be allocated to the manufacturing processes, the order in which processes should be performed, etc. To generate the schedule, the BB scheduling component can extract data from the manufacturing environment. The data can include information regarding resources (e.g., such as a number of lots, in the case of semiconductors) available for processing, and one or more devices operating in the manufacturing environment. The BB scheduling component may convert the data from a first schema (or format) used by the manufacturing environment to a second schema. The BB scheduling component may determine, based on the converted data, an allocation of the resources to the one or more devices operating in the manufacturing environment, and may determine an order in which one or more of the resources should be processed by the one or more devices. The BB scheduling component can publish the determined allocation and the processing order to at least one another device (e.g., to automate the one or more devices within the manufacturing environment, based on the determined allocation and processing order, to save the schedule for later evaluation by a user, etc.).

In one embodiment, the BB scheduling component performs each of the above operations based on various blocks within a BB workflow. Each block of the BB workflow specifies one or more operations of the set of operations that the BB scheduling component performs when the BB scheduling component executes the workflow. Using the techniques presented herein, a user can edit and/or customize the sequence of operations (that are executed by the BB scheduling component) by changing the order of the blocks in the BB workflow, adding/removing blocks in the BB workflow, etc. Further, the techniques presented herein also allow a user to configure some or all of the operations within one or more blocks of the BB workflow with one or more BB rules and reports. For example, upon executing one or more blocks in the BB workflow, the BB scheduling component may further evaluate at least one BB sub-rule or report configured for the respective workflow block in order to perform the operations specified by the workflow block. Doing so in this manner provides manufacturing facilities the ability to edit, and customize (e.g., without understanding or writing code) scheduling operations to account for any changes in the manufacturing facility.

Note that, for the sake of convenience, terminology related the manufacture of semiconductor devices is used in much of the following description as a reference example of a manufacturing production process that can be scheduled using the techniques presented herein. Similarly, many of the following embodiments use front-end and back-end semiconductor manufacturing facilities as reference examples of types of manufacturing environments in which the techniques presented herein can be used to provide a scheduling system that is open, extensible, and fully configurable by an end-user. Note, however, that the techniques presented herein can also be applied to other types of manufacturing environments (e.g., in other industries), manufacturing processes, etc.

Figure 1:
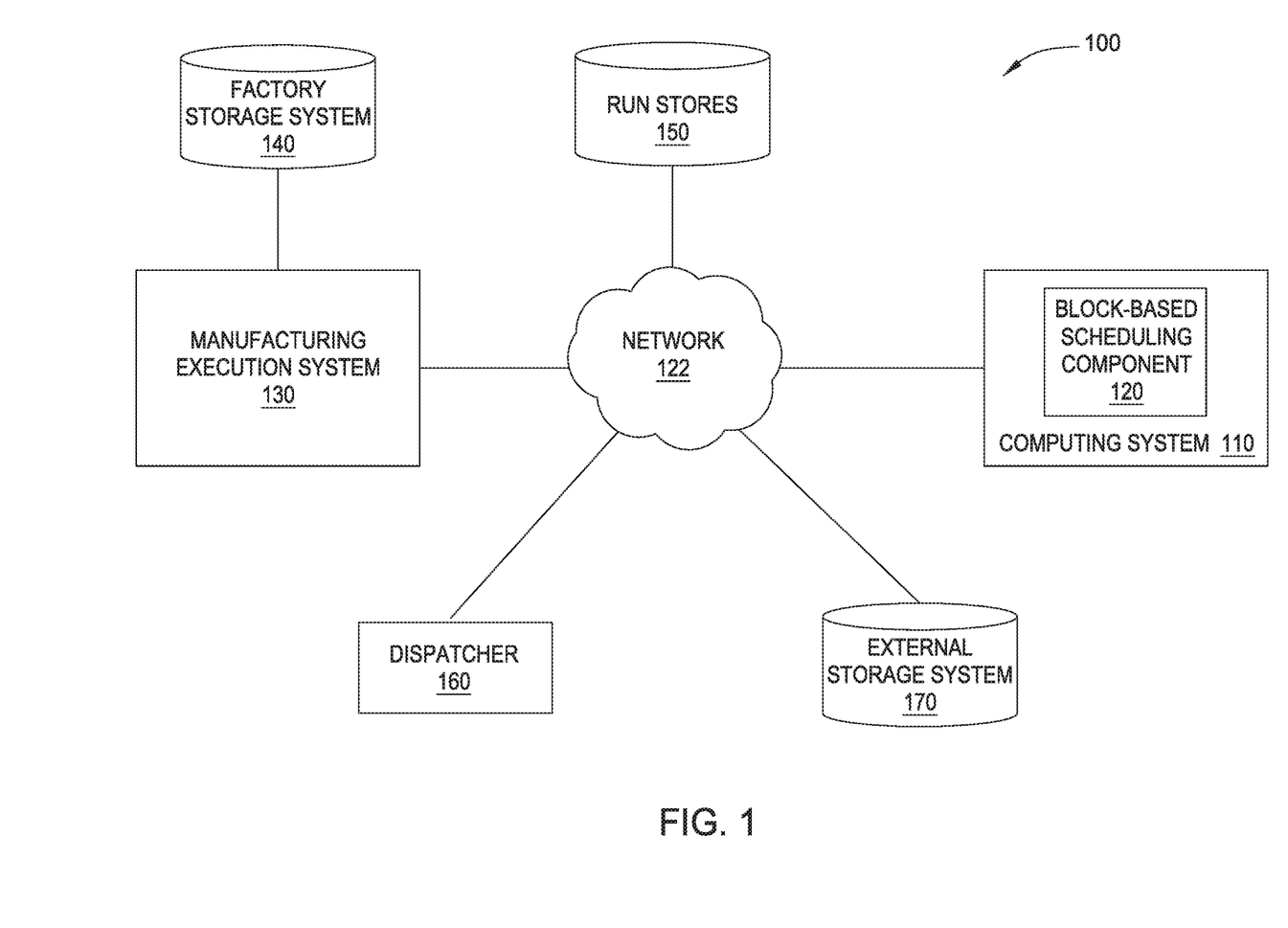
FIG. 1 illustrates a block diagram of an architecture of a manufacturing environment configured with a block-based scheduling component, in accordance with embodiments of the present disclosure.

FIG. 1 is a block diagram illustrating an architecture of a manufacturing environment (or system) 100, in which aspects of the present disclosure may be practiced. For example, in one embodiment, the manufacturing environment 100 is an example of a semiconductor manufacturing system. As shown, the manufacturing environment 100 includes a computing system 110, manufacturing execution system (MES) 130, factory storage system 140, dispatchers 160, run stores 150 and external storage system 170 connected via a network 122. In general, the network 122 can be a wide area network (WAN), local area network (LAN), wireless LAN (WLAN), etc. The factory storage system 140, external storage system 170 and run stores 150, in general, can be any kind of storage system, including, for example, relational and/or hierarchal databases, distributed filing systems, etc. In one embodiment, the computing system 110, MES 130, and dispatchers 160 can be any kind of physical computing system having a network interface, such as a desktop computer, laptop computer, mobile device, tablet computer, server computing systems, gateway computers, and the like.

The MES 130 is generally configured to manage and control the operation of a current work-in-progress (WIP) within the manufacturing environment 100. For example, the MES 130 can monitor the operation of one or more tools (or equipment) operating in the manufacturing environment 100, receive data directly from the tools, analyze data from the tools, and/or collect the data. In one embodiment, the MES 130 can store the data (received from the tools) into factory storage system 140. Such information stored in the factory storage system 140 can include information regarding the current WIP, current tool state, manufacturing data, etc.

As shown, the computing system 110 includes BB scheduling component 120. The BB scheduling component 120 generally represents logic (e.g., a software application, device firmware, an ASIC, etc.) that is configured to implement one or more of the techniques presented herein. For example, the BB scheduling component 120 could perform method 500 illustrated in FIG. 5, method 600 illustrated in FIG. 6, and/or any of the techniques (or combination of techniques) described herein. In one embodiment, the BB scheduling component 120 generates schedules to manage some or all of the tasks performed in the manufacturing environment 100. For example, in the case of semiconductor manufacturing, the manufacturing system can perform several different tasks related to the fabrication of semiconductor wafers (e.g., associated with front-end processing), cutting, assembly, and testing of semiconductor die on the wafers (e.g., associated with back-end processing), and the like. Examples of tasks can include, but are not limited to, a task to manufacture a product (e.g., a semiconductor wafer), a task to use a manufacturing tool, a task to inspect a manufacturing tool, a task to process one or more lots of semiconductor wafers, etc. In some cases, the manufacturing system may have a large number of lots that need to be processed. To manage the processing, the BB scheduling component 120 may periodically generate schedules (e.g., every five minutes, ten minutes, or some other configurable time period) to allocate some or all of the lots to available tools, sequence the lots, etc. For example, the schedule can include a list of which tasks should be processed on which tool and at what time.

In one embodiment, once the BB scheduling component 120 generates a schedule, the BB scheduling component 120 provides the schedule to dispatchers 160, which are generally configured to dispatch (e.g., according to the schedule) the lots to the tools for processing. For example, the dispatchers 160 can automate the one or more devices within the manufacturing environment according to the generated schedule. Alternatively or additionally, once the BB scheduling component 120 generates a schedule, the BB scheduling component 120 can write (or save) the schedule to an external storage system 170. Maintaining the generated schedules in the external storage system 170 allows the BB scheduling component 120 to make the schedules available to different entities that request the schedules.

In one embodiment, the BB scheduling component 120 is configured to execute one or more BB workflows in order to provide a schedule. The BB scheduling component 120 can receive a workflow (e.g., created by an end-user) that includes a plurality of blocks where each block in the workflow specifies one or more operations that are performed when the BB scheduling component 120 executes the respective block. This workflow can be more easily edited and/or customized (e.g., by a user) without any specialized programming knowledge, relative to conventional scripting solutions. For example, the user can rearrange the blocks in the workflow (e.g., to adjust the steps that the scheduling component 120 performs when generating a schedule), add blocks to the workflow (e.g., to add steps that the BB scheduling component 120 performs when generating a schedule), and/or remove blocks from the workflow (e.g., to remove steps that the BB scheduling component 120 performs when generating a schedule). As described below, the user can also configure the specific operations for one or more blocks in the workflow with a BB sub-rule and/or report. Doing so in this manner provides a fully configurable scheduling system that allows manufacturing systems to adapt their scheduling systems, as needed, without undergoing the expensive, time-consuming efforts associated with adapting legacy scheduling systems.

In one embodiment, the BB scheduling component 120 is configured to write, for each scheduling run, some or all the input and/or output data associated with the blocks of the workflow to the run stores 150. This data captures the state of the manufacturing system at one or more steps of a scheduling run, such that, in the event there is a problem with a generated schedule, the manufacturing system can reproduce the problem since all data needed to reproduce what occurred is available in run stores 150. In this manner, the manufacturing system can troubleshoot any problems by retrospectively debugging the system.

Note, however, that FIG. 1 illustrates merely one possible arrangement of the manufacturing environment 100. More generally, one of ordinary skill in the art will recognize that other embodiments of manufacturing systems can also be configured to implement scheduling in accordance with the techniques presented herein. For example, although the scheduling system 110, MES 130 and dispatchers 160 are shown as separate entities, in other embodiments, these components could be included as part of one computing system.

Figure 2:
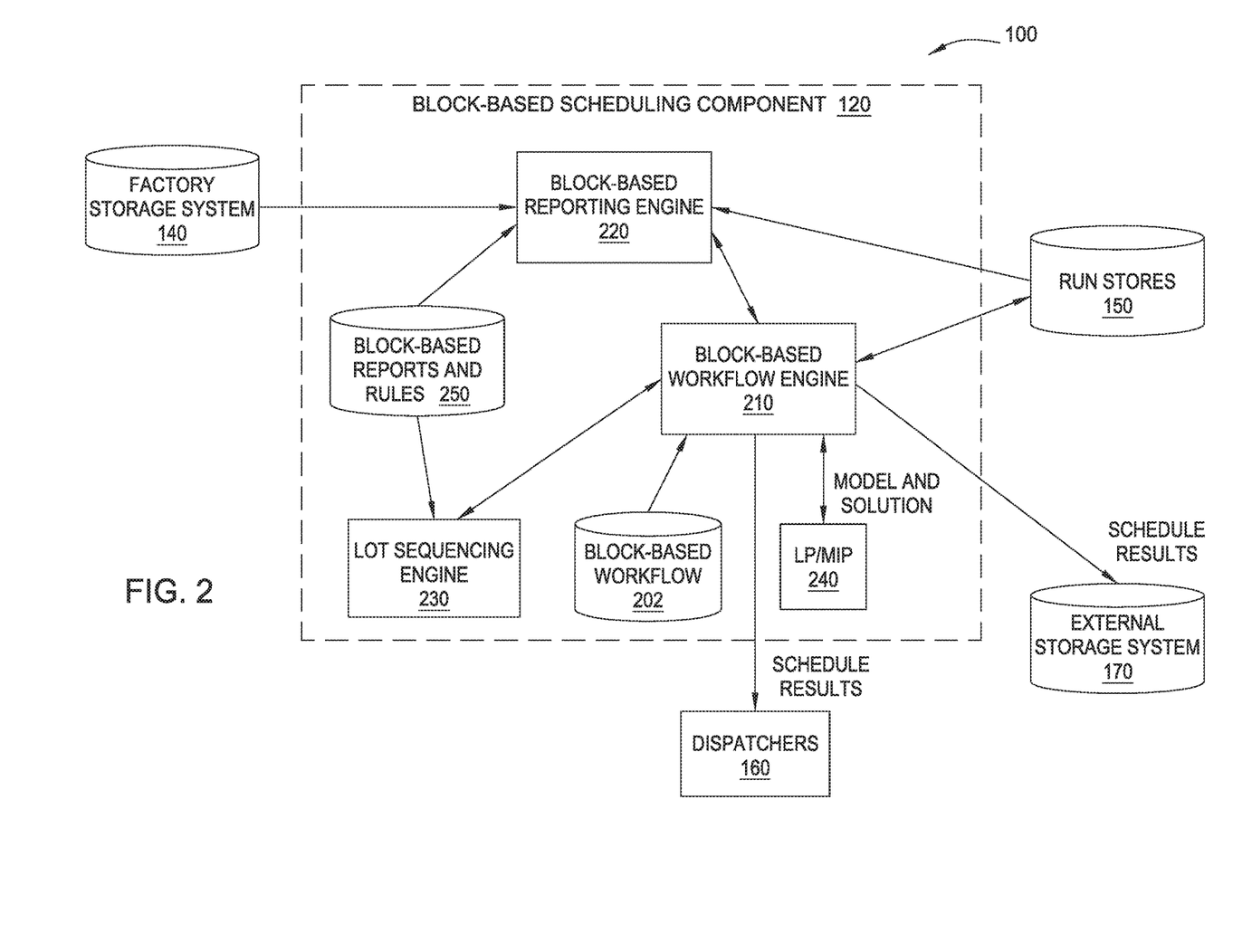
FIG. 2 illustrates a block diagram of an architecture of a block-based scheduling component within a manufacturing environment, in accordance with embodiments of the present disclosure.

FIG. 2 further illustrates an example of the BB scheduling component 120 described relative to FIG. 1, according to one embodiment. The BB scheduling component 120 is configured to build a schedule for the manufacturing environment 100 and its components. For example, the schedule (generated by the BB scheduling component 120) may specify what pieces of equipment should be used to process a particular number of lots, the specific times that the pieces of equipment should be used, the quantity and composition of the product that should be used by the pieces of equipment, and the like. As mentioned above, the lots can refer to one or more semiconductor wafers (e.g., for front end), partially finished semiconductor wafers, one or more semiconductor die (e.g., for back-end), etc.

As shown, the BB scheduling component 120 includes a BB workflow engine 210, a BB reporting engine 220, a lot sequencing engine 230, BB reports and rules (RR) storage system 250, a BB workflow storage system (e.g., database) 202, and linear programming (LP)/mixed integer programming (MIP) solver 240. In one embodiment, the BB workflow engine 210 interacts with and manages BB reporting engine 220, lot sequencing engine 230 and LP/MIP solver 240 in order to provide a schedule for the manufacturing environment 100. The BB workflow storage system 202 includes one or more BB workflows, each of which can be used (e.g., by the BB scheduling component 120) to schedule a portion of the tools in the manufacturing environment 100. The BB workflows can be created, edited and/or customized by a user and stored in the BB workflow storage system 202.

In one embodiment, the BB workflow engine 220 receives at least one BB workflow (e.g., from a user) or retrieves at least one BB workflow (e.g., from BB workflow storage system 202, etc.) and executes each of the blocks in an order specified within the BB workflow(s). As mentioned above, each block of the BB workflow(s) specifies one or more operations that are performed (e.g., by one of the BB reporting engine 220, lot sequencing engine 230, LP/MIP solver 240, etc.) when the BB workflow engine 210 executes the respective block. Examples of operations that can be included within the BB workflow(s) include, but are not limited to, retrieving data about the manufacturing facility, transforming and manipulating the data, generating a schedule based on the data, making the schedule available to one or more requestors, saving information about the state of the manufacturing facility, performing error checking on the schedule and data, reporting the error to a user, etc. In this manner, the BB workflow engine 210 can control the sequence of operations that the BB scheduling component 120 performs to provide a schedule.

According to various embodiments, depending on the blocks specified in the BB workflow(s), the BB scheduling component 120 can use one of the BB workflow engine 210, BB reporting engine 220, lot sequencing engine 230 or LP/MIP solver 240 to execute the respective block. For example, in one embodiment, the BB scheduling component 120 can extract, via the BB reporting engine 220, data about the manufacturing environment 100 from the factory storage system 140. In some embodiments, the BB reporting engine 220 can query other systems and/or web services (e.g., using representational state transfer (REST), or some other communication protocol) for data about the manufacturing environment 100. Such data can include, for example, descriptions of equipment in the manufacturing environment 100, capabilities of different pieces of equipment, current state of equipment, what product is currently being processed by equipment, characteristics of the product, and the like.

Upon extracting the information, the BB scheduling component 120 can use the BB reporting engine 220 to perform one or more transformations or manipulations on the extracted data. For example, the data extracted from factory storage system 140 may be in a format (or schema) that is specific or proprietary to the manufacturing environment 100 and not compatible with the BB scheduling component 120. In these situations, the BB reporting engine 220 can convert the data from the proprietary format to a common schema that is compatible with the rest of the BB scheduling component 120. In addition, the BB reporting engine 220 can evaluate the data in the proprietary format and common schema data for errors, and if errors are detected, correct the errors in the common schema data, and report the errors to a user (e.g., via email, storing in a database, etc.). In some embodiments, the BB reporting engine 220 can use at least one BB sub-rule and/or report within the BB RR storage system 250 to perform the data extraction, data conversion, error checking, etc. For example, the BB reports and/or rules can be created by a user and allow the user to configure, without the need to understand or write any code, the operations for each block in the BB workflow(s). In this manner, the techniques presented herein allow the user to customize the operations for the blocks in the scheduling workflow that may be used to extract data, convert the data, and/or perform error checking.

In one embodiment, once the BB reporting engine 220 converts the extracted data into a common scheduling schema and performs error checking on the common schema data, the BB workflow engine 210 may evaluate the data and generate a schedule for the manufacturing environment 100. In some embodiments, the BB workflow engine 210 can use the LP/MIP solver 240 and/or lot sequencing engine 230 to generate the schedule. For example, the BB workflow engine 210 can use the LP/MIP solver 240 to create and run a LP/MIP mathematical programming model to allocate lots to tools and time intervals. Additionally or alternatively, the BB workflow engine 210 can use the lot sequencing engine 230 to determine the sequence the lots should process on the tools. Note that, although the lot sequencing engine 230, BB reporting engine 220 and LP/MIP solver 240 are shown within the BB scheduling component 220, in some embodiments, the lot sequencing engine 230, BB reporting engine 220 and/or LP/MIP solver 240 can be external to the BB scheduling component 220.

Each of the LP/MIP solver 240 and the lot sequencing engine 230 can be configured with one or more BB rules and/or reports created by a user and stored in the BB RR storage system 250. Referring to the LP/MIP solver 240, one or more BB reports can be used to setup the LP/MIP model, determine constraints for the LP/MIP model, convert data into a format understood by the LP/MIP solver 240 (e.g., if any proprietary mathematical solvers are used, etc.), etc. In addition, one or more BB rules (created by a user) can be used to configure the objective function for the LP/MIP model, determine which constraints will govern the LP/MIP model, process the results of the LP/MIP solver 240 that runs the model (e.g., which can include converting the results back to the common schema, etc.), and the like. In general, the LP/MIP solver 240 can use any LP and/or MIP solver (e.g., open source, proprietary, etc.) to determine an optimal (or near optimal) allocation of lots to tools.

In one embodiment, once the BB workflow engine 210 determines (via the LP/MIP solver 240) an optimal (or near optimal) allocation of lots to the tools, the BB workflow engine 210 can execute one or more blocks (if included in the BB workflow(s)) for lot sequencing (e.g., performed via the lot sequencing engine 230). For example, the lot sequencing engine 230 can receive the common schema data and/or the results of the optimal (or near optimal) allocation from the BB workflow engine 210 and determine an order in which the lots should be processed by the tools. In one embodiment, the lot sequencing engine 230 can be configured with at least one BB rule and BB report in the BB RR storage system 250 to determine which lot should be sequenced next. For example, the lot sequencing engine 230 can use one or more BB reports to create data for the lot sequencing engine 230 (e.g., converting or manipulating data into a format recognizable by the lot sequencing engine, etc.) and to process the results of the lot sequencing engine 230. In addition, the lot sequencing engine 230 can use one or more BB rules to evaluate the currently sequenced lots, common schema data (e.g., including lot and tool manufacturing information), and/or other information that a user may want considered by the BB scheduling component 120, and determine an optimal (or near optimal) processing order based on the information.

In one embodiment, once the lot sequencing engine 230 determines the processing order, the lot sequencing engine 230 provides the results to the BB workflow engine 210, which can publish the results of the processing order and the optimized allocation to at least one of the dispatchers 160 or external storage system 170. In one embodiment, the BB workflow engine 210 can use at least one BB report and/or rule (e.g., within BB RR storage system 250) to process the final results (e.g., converting the results back to the schema used by the manufacturing environment, etc.) before publishing the results to at least one of the dispatchers 160 or external storage system 170.

As mentioned above, the techniques presented herein also allow the BB scheduling component 120 to evaluate generated schedules and perform troubleshooting in the event of any problems or errors. For example, in one embodiment, upon receiving the input and output data associated with the execution of each block in the BB workflow, the BB workflow engine 210 writes some or all of the input and/or output data for one or more blocks to the run stores 150. For example, for each scheduling run, the BB workflow engine 210 can write any one of the extracted data, common schema data, LP/MIP model and its results, lot sequencing input and output, published results, and other information associated with blocks in the BB workflow to the run stores. In one embodiment, the BB workflow engine 210 writes to a file system directory (within the run stores 150) that is unique to each scheduling run. In this manner, the BB scheduling component 120 is able to reproduce the state of the manufacturing environment 100 for one or more steps of a scheduling run. The BB scheduling component 120, for example, can evaluate the data associated with one or more steps via the BB reporting engine 220 (and via one or more BB reports and rules) to determine any changes that need to be made to the scheduling process. As such, the techniques presented herein allow for retrospective debugging, since all the data associated with one or more steps of a scheduling run can be made available via the run stores 150.

Note, however, that FIG. 2 illustrates merely one possible arrangement of the BB scheduling component 120. More generally, one of ordinary skill in the art will recognize that other embodiments of the BB scheduling component 120 can also be configured to implement scheduling in accordance with the techniques presented herein. For example, although the BB workflow engine 210, BB reporting engine 220, lot sequencing engine 230 and LP/MIP solver 240 are shown as separate entities, in other embodiments, these components could be included as part of one computing system.

Figure 3:
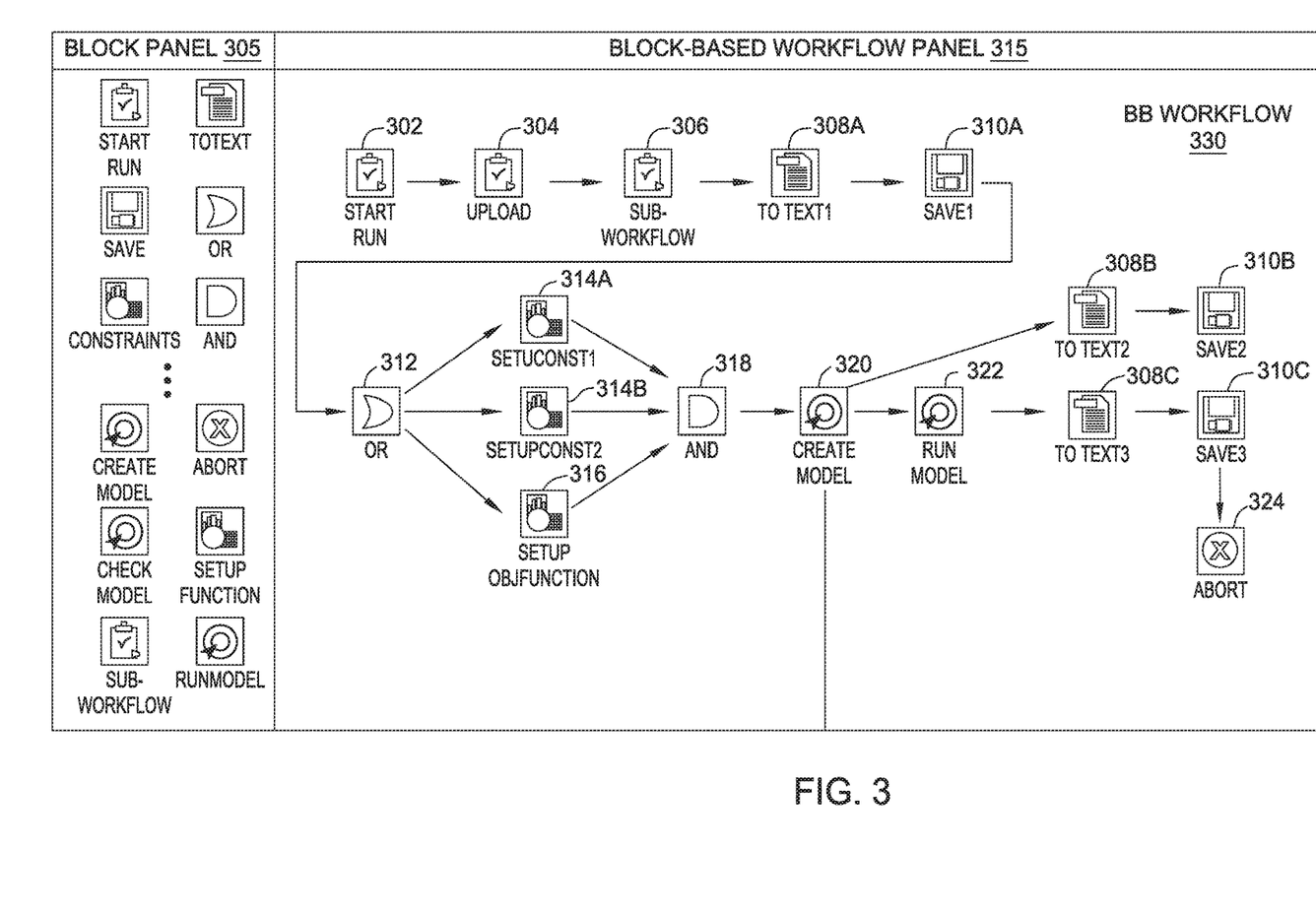
FIG. 3 illustrates an interface with a block-based workflow for providing a schedule for a manufacturing environment, in accordance with embodiments of the present disclosure.

FIG. 3 illustrates a user interface 300 with a BB workflow 330 that can be used to provide a schedule for a manufacturing environment, according to one embodiment. As shown, the user interface 300 includes a block panel 305 and a BB workflow panel 315. The block panel 305 includes a plurality of blocks that allow a user to customize operations within a BB workflow to generate a schedule for a manufacturing environment. In this embodiment, each block is depicted as a small image characteristic of the block's function. However, note that, in general, the blocks can be depicted in other manners (e.g., size, shape, color, etc.). BB workflow panel 315 illustrates one example of a BB workflow 330. Note that, for the sake of convenience, only a portion of the BB workflow 330 is illustrated. More generally, those of ordinary skill in the art will recognize that a user can create and/or modify any BB workflow to include any number of blocks.

In one embodiment, the user interface (UI) 300 is a graphical user interface (GUI) that allows the user to drag and drop blocks from block panel 305 into BB workflow panel 315. The user can arrange the blocks (in BB workflow panel 315) in any order or configuration, which allows the user to quickly adapt the scheduling system to any changes within the manufacturing environment, without understanding or writing any code. For example, each block in the block panel 305 is a logical abstraction that represents an operation or a series of operations that can be performed to generate a schedule. In one embodiment, the UI 300 allows the user to specify one or more properties for each block in the workflow panel 315. The one or more properties can specify a data source for the block, timing of one or more operations associated with the block, and/or other criteria associated with performing the operations associated with the block. In one embodiment, the operations and/or the properties for each block in the BB workflow panel 315 can be stored in one or more block definition files that the BB scheduling component can access in order to execute each block.

In one embodiment, once the BB scheduling component 120 executes the BB workflow, the BB scheduling component 120 reads the definition files, converts the operations listed in the files into a low-level script that the BB scheduling component 120 executes to generate a schedule. The BB scheduling component 120 can provide the schedule to dispatchers 160 (e.g., which can dispatch tools to processes in accordance with the schedule), evaluate the schedule for errors, or provide the schedule to anyone that requests the schedule.

In another embodiment, once the BB scheduling component 120 retrieves at least one BB workflow from the BB workflow storage system 202, the BB scheduling component 120 reads and parses the BB workflow to determine the type of blocks within the BB workflow. The BB scheduling component 120 can access one or more block definitions corresponding to each type of block within the BB workflow. The BB scheduling component 120 can execute the BB workflow based on the block definitions and/or the properties of the blocks in the BB workflow. For example, in one implementation, the BB scheduling component 120 can determine at least one function to call to perform the operations in the block (e.g., execute the block) based on the block type and/or properties of the block. The BB scheduling component 120 can then execute the BB workflow by performing the set of operations using the determined functions.

In this particular embodiment, this portion of the BB workflow 330 includes blocks 302-324, which together specify a sequence of operations which, when executed by the BB scheduling component 120, can result in generation of a schedule. Specifically, block 302 defines a start operation that triggers the initial execution of the BB workflow 330. In one embodiment, block 302 can further reference a BB sub-rule (e.g., such as that described below with reference to FIG. 4) that specifies how often the BB workflow 330 executes (e.g., every 5 minutes, 10 minutes, etc.). Block 304 defines an operation for uploading/extracting/retrieving data from one or more sources (e.g., a database, user, etc.). Block 306 defines a processing operation that can call a BB sub-workflow (not shown). For example, the BB sub-workflow can be used to perform operations such as convert the data to a common schema, perform error checking, etc. Further, each of these operations in the BB sub-workflow can further be configured with one or more BB sub-rules and/or reports.

Blocks 308A-308C represent operations for converting data to a text file. Blocks 310A-310C represent operations for saving data (e.g., to a run store or other storage system) at different points in the BB workflow sequence. Blocks 312-322 represent operations that may be performed to setup, create, and run a model, such as a LP/MIP model, to determine an optimal allocation of lots to tools in the manufacturing environment 100. For example, to setup the LP/MIP model, blocks 314A-314B can determine (e.g., based on a BB rule and/or report) constraints, block 316 can setup an objective function(s) for the model, block 320 can create the model based on the inputs, and block 322 can run the model. Lastly, block 324 represents an abort operation that may be performed in the event the workflow is unable to determine an allocation.

Note that the BB workflow 330 depicted in FIG. 3 and described above represents merely one example of a sequence of blocks that can be configured, e.g., by a user without coding. In general, the techniques presented herein can be used to modify and/or customize a scheduling system to any manufacturing environment.

Figure 4:
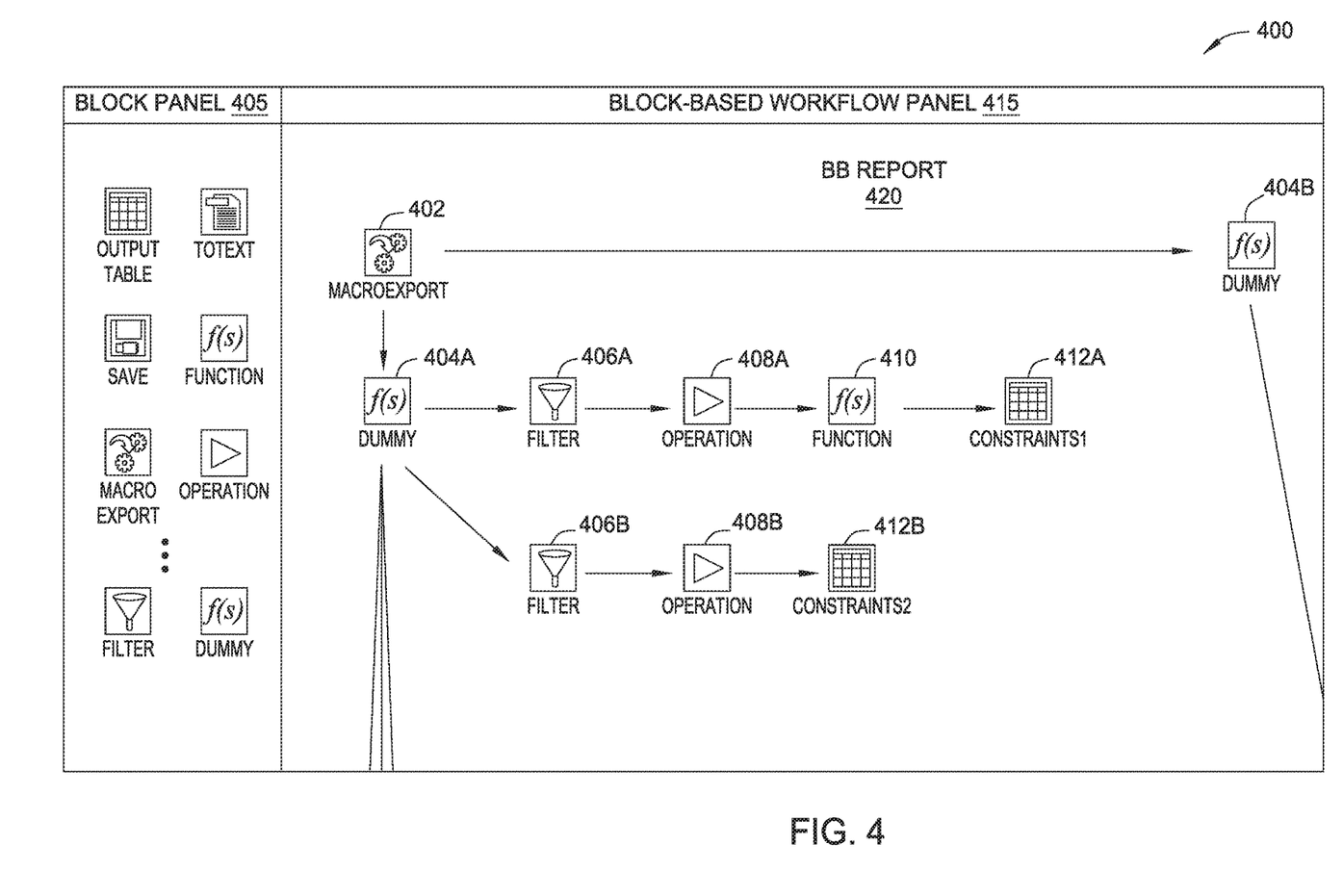
FIG. 4 illustrates an interface with a block-based report for configuring the set of operations for a block of a block-based workflow, in accordance with embodiments of the present disclosure.

FIG. 4 illustrates a user interface 400 with a BB report that can be used to configure a set of operations to be performed for a particular block in a BB workflow, according to one embodiment. As shown, the user interface 400 includes a block panel 405 and a BB reports and rules panel 415. The block panel 405 includes a plurality of blocks that allow a user to configure operations for a BB report (and/or rule) that can be used by a block within a BB workflow. In this particular embodiment, the BB reports and rules panel 415 includes a BB report 420. Note that, for the sake of convenience, BB panel 415 illustrates only a portion of the BB report 420. More generally, those of ordinary skill in the art will recognize that a user can create and/or modify the BB report 420 to include any number of blocks.

Similar to the UI 300 in FIG. 3, in one embodiment, the user interface 400 is a GUI that allows the user to drag and drop blocks from block panel 405 into BB RR panel 415. The user can arrange the blocks (in BB RR panel 415) in any order or configuration. Each block in the block panel 405 is also a logical abstraction that represents one or more operations for configuring the blocks in the block panel 305. In this particular embodiment, BB report 420 can be used to configure one or more operations performed for blocks 312B-312C of FIG. 3. For example, blocks 402-412 of the BB report 420 specify a certain series of operations for determining constraints that can be used to setup an LP/MIP model. Specifically, block 402 represents a macro operation that pulls information from another report (e.g., located in a database, generated from another BB report, etc.).

Blocks 404A and 404B represent operations for manipulating the data pulled in from the block 402. For example, blocks 406A-412A specify data manipulation operations for generating a first set of constraints; blocks 406B-412B specify data manipulation operations for generating a second set of constraints; and so on. Examples of the different operations that can be configured with the blocks 406-412, include filtering operations (e.g., with blocks 406A-B, removing data entries that do not satisfy a particular condition), compressing operations (e.g., with blocks 408A-B, reducing the information based on one or more criteria), transformations (e.g., with block 410), and so on. Once the data manipulation operations are completed, blocks 412A-412B can be used to generate tables with the results, which in this embodiment represent the different constraints for the LP model.

In one embodiment, the one or more operations for each block within the BB report 420 can be stored in definition file(s) that the BB scheduling component 120 can access in order to convert the operations into a low-level script for configuring the blocks in the BB workflow panel 315. In another embodiment, the BB scheduling component 120 can access definition file(s) corresponding to different types of blocks, and determine at least one function to call in order to execute the blocks (e.g., to configure the blocks in the BB workflow panel 315) based on the definition files and one or more properties for each block. Note that the BB report 420 depicted in FIG. 4 and described above represents merely one example of a sequence of blocks that can be configured, e.g., by a user without coding.

Figure 5:
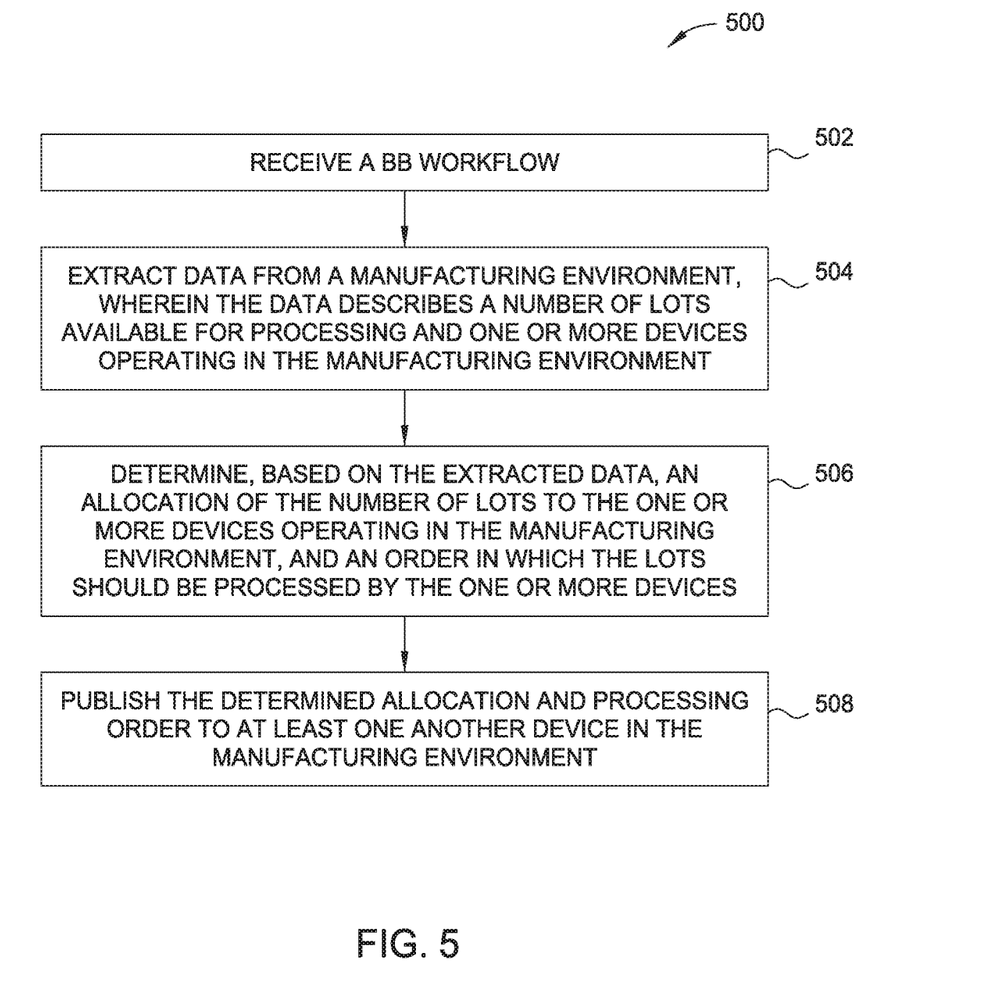
FIG. 5 is a flow diagram illustrating a method for providing a schedule for a manufacturing environment, using a block-based workflow, in accordance with embodiments of the present disclosure.

FIG. 5 is a flow diagram of a method 500 for executing a BB workflow to provide a schedule for a manufacturing environment, according to one embodiment. As shown, the method begins at block 502, where a BB scheduling component 120 receives a BB workflow (e.g., from a user). The BB workflow includes a plurality of blocks that specify a set of operations for generating a schedule for a manufacturing environment. To perform the set of operations, at block 504, the BB scheduling component 120 extracts data (e.g., via the BB reporting engine) from the manufacturing environment. In one embodiment, the data includes scheduling data that describes a number of lots available for processing and one or more devices operating in the manufacturing environment. In some embodiments, the BB scheduling component 120 can convert the data from a first schema (or format) used by the manufacturing environment to a second schema. For example, as mentioned above, the second schema can be a common scheduling schema that is compatible with the entire scheduling system. The BB scheduling component 120 can also evaluate the data in at least one of the first schema or second schema for errors, and report any errors to a user.

At block 506, the BB scheduling component 120 determines, based on the extracted data, an allocation of the number of lots to the one or more devices operating in the manufacturing environment, and an order in which the lots should be processed by the one or more devices. In one embodiment, the BB scheduling component can employ an LP/MIP solver (configured with at least one BB report or rule) to determine an optimal allocation. In one embodiment, the BB scheduling component 120 can employ an external lot sequencing engine (e.g., configured with at least one BB report or rule) to determine the processing order. At block 508, the BB scheduling component 120 publishes the determined allocation and processing order to at least one another device in the manufacturing environment. In one embodiment, the BB scheduling component automates the one or more devices within the manufacturing environment based on the determined allocation and the processing order. For example, as mentioned above, the BB scheduling component 120 can publish the determined allocation and processing order to dispatchers 160 to automate the one or more devices. Additionally or alternatively, the BB scheduling component 120 can write (or save) the determined allocation and processing order to one or more storage systems (e.g., such as external storage system 170, etc.) in the manufacturing environment.

Figure 6:
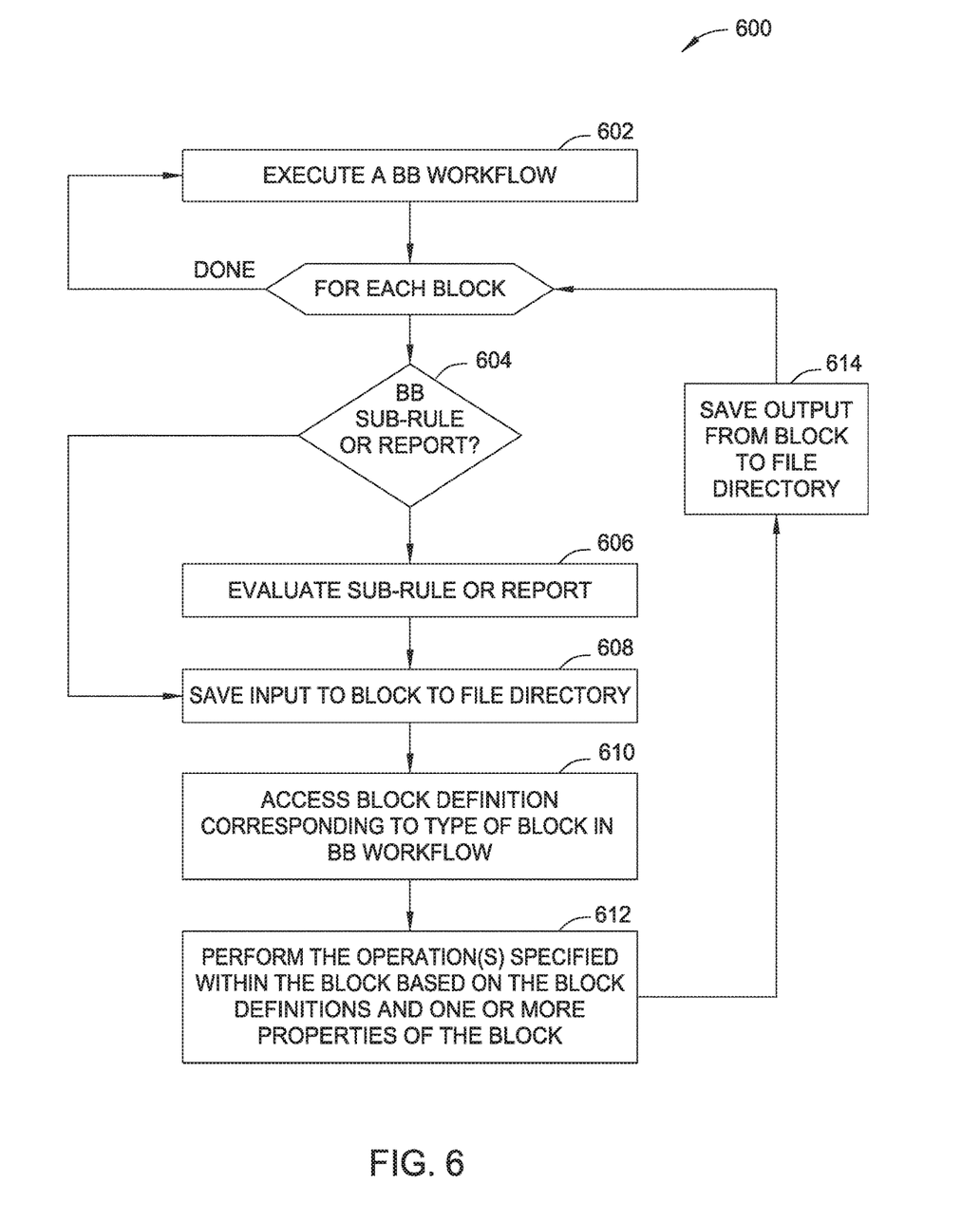
FIG. 6 is a flow diagram illustrating another method for providing a schedule for a manufacturing environment, using a block-based workflow, in accordance with embodiments of the present disclosure.

FIG. 6 is a flow diagram of a method 600 for executing a block-based workflow to provide a schedule for a manufacturing environment, according to one embodiment. As shown the method begins at block 602, where the BB scheduling component 120 executes a BB workflow. For each block, the BB scheduling component, at block 604, determines if the block is configured with a BB sub-rule or report (block 604). If so, the BB scheduling component 120 evaluates, at block 606, the BB sub-rule or report to determine at least one operation to perform when executing the workflow block. After evaluating the BB sub-rule or report (or if the BB scheduling component 120 determines the workflow block is not configured with a BB sub-rule or report), the BB scheduling component 120 saves, at block 608, the input to the workflow block to a file directory (e.g., such as in run stores 150). In one embodiment, the BB scheduling component 120 can save some or all of the input from the workflow block to the file directory. In one embodiment, the BB scheduling component 120 can determine to save none of the input from the workflow block to the file directory (e.g., in situations where the BB scheduling component 120 can reproduce the state of the manufacturing environment without such data, etc.). At block 610, the BB scheduling component 120 accesses a block definition corresponding to a type of the block in the BB workflow. At block 612, the BB scheduling component 120 performs the operation(s) specified within the block based on the block definitions and one or more properties of the block. For example, as mentioned above, the BB scheduling component 120 can determine at least one function to call in order to execute the workflow block, based on the block definition and/or one or more properties of the block. At block 614, the BB scheduling component 120 saves the output from the workflow block to the file directory. In one embodiment, the BB scheduling component 120 can save some or all of the output from the workflow block to the file directory. In one embodiment, the BB scheduling component can determine to save none of the output from the workflow block to the file directory (e.g., in situations where the BB scheduling component 120 can reproduce the state of the manufacturing environment without such data, etc.). Doing so in this manner, allows the scheduling system to reproduce the state of the manufacturing environment at each step of the scheduling run, which can be used to troubleshoot the scheduling process in the event of errors.

Figure 7:
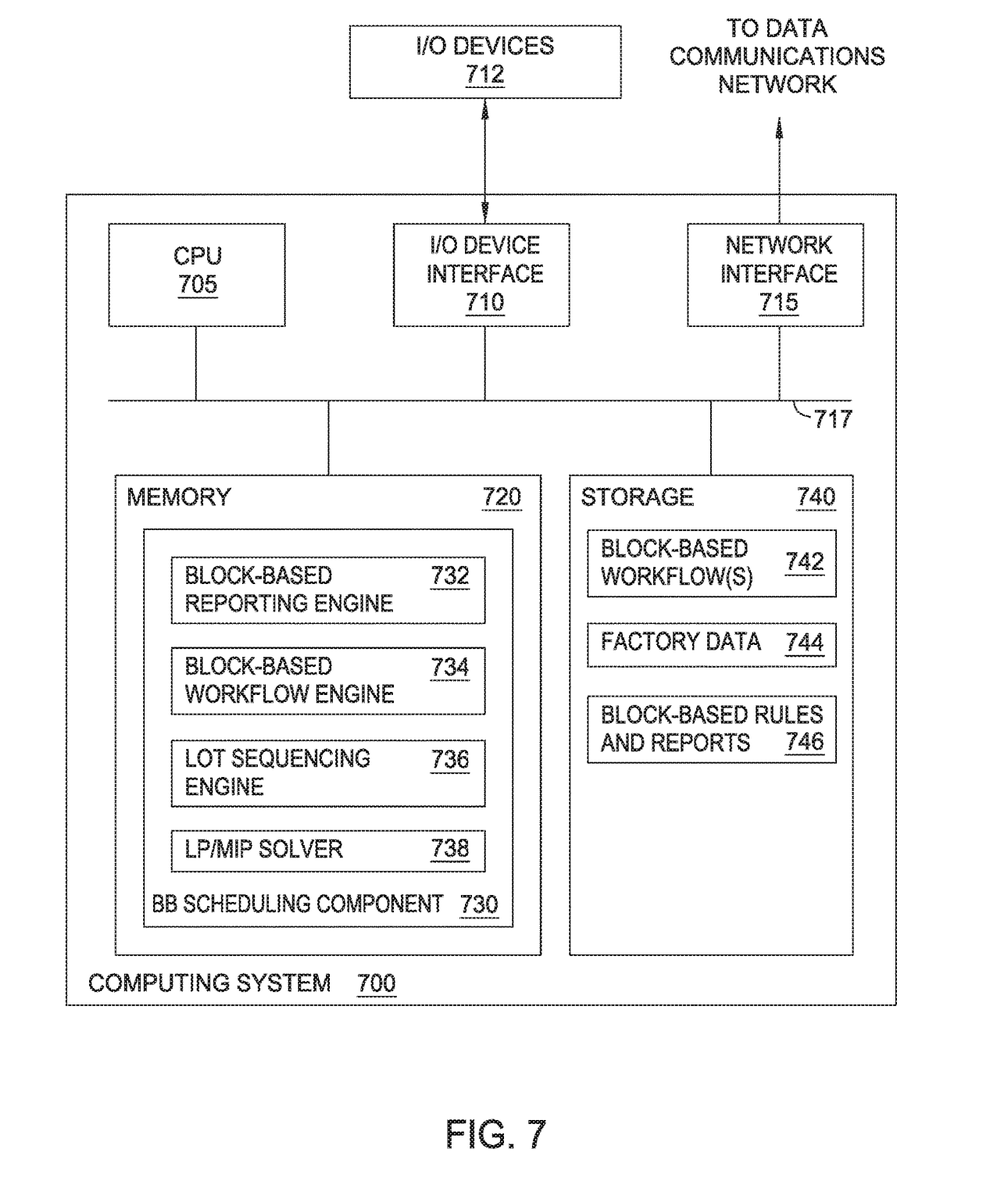
FIG. 7 illustrates a computing system configured with a block-based scheduling component, in accordance with embodiments of the present disclosure.

FIG. 7 illustrates a computing system 700 configured to execute a block-based workflow to provide a schedule for a manufacturing environment, according to one embodiment. As shown the computing system 700 includes, without limitation, a central processing unit (CPU) 705, a network interface 715, a memory 720, and storage 740, each connected to a bus 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect 717 is used to transmit programming instructions and application data between CPU 705, I/O devices interface 710, storage 740, network interface 715, and memory 720. Note, CPU 705 is included to be representative of a single CPU, multiple CPUs, a single CPU having multiple processing cores, and the like. Memory 720 is generally included to be representative of a random access memory. Storage 740 may be a disk drive storage device. Although shown as a single unit, storage 740 may be a combination of fixed and/or removable storage devices, such as fixed disc drives, removable memory cards, or optical storage, network attached storage (NAS), or a storage area-network (SAN).

Illustratively, the memory 720 includes a BB scheduling component 730, which includes BB reporting engine 732, a BB workflow engine 734, lot sequencing engine 736, and LP/MIP solver 738. The storage 740 includes BB workflow(s) 742, factory data 744 and BB rules and reports 746. Further, although not shown, memory 720 can also include a LP/MIP solver (e.g., LP/MIP solver 240), dispatchers 160, etc. In one embodiment, the BB workflow engine 734 executes each of the blocks in BB workflow(s) 742. For example, as mentioned above, each block in the BB workflow(s) 742 can specify one or more operations to be performed when executing each block. Further, one or more operations can be configured with one or more BB reports and rules (e.g., stored in BB rules and reports 746). As also mentioned above, the BB workflow engine 734 can further interact with the BB reporting engine 732 and the lot sequencing engine 736 when executing the workflow blocks.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C#, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, executed in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for executing a block-based (BB) workflow to provide a schedule for a semiconductor manufacturing environment, comprising:
   receiving at least one BB workflow comprising a plurality of blocks, wherein the plurality of blocks specify a set of operations for generating the schedule for the semiconductor manufacturing environment;
   accessing a plurality of block definitions corresponding to the plurality of blocks; and
   executing the at least one BB workflow by performing the set of operations based on the plurality of block definitions, comprising:
      extracting data from the semiconductor manufacturing environment, wherein the data describes a number of lots available for processing and one or more manufacturing tools operating in the semiconductor manufacturing environment, and wherein each lot comprises a plurality of semiconductor substrates or a plurality of semiconductor die;
      determining, based on the extracted data, an allocation of the number of lots to the one or more manufacturing tools operating in the semiconductor manufacturing environment, and an order in which the lots should be processed by the one or more manufacturing tools; and
      publishing the determined allocation and processing order to at least one another manufacturing tool in the semiconductor manufacturing environment; and
   operating one or more manufacturing tools in the semiconductor manufacturing environment to at least one of fabricate, package, or test one or more semiconductor devices on the plurality of semiconductor substrates or the plurality of semiconductor die according to the determined allocation and processing order.

2. The method of claim 1, wherein executing the at least one BB workflow further comprises:
   converting the extracted data from a first schema used by the semiconductor manufacturing environment to a second schema;
   evaluating the data in at least one of the first schema or second schema for errors; and
   reporting any errors to a user.

3. The method of claim 1, wherein executing the at least one BB workflow further comprises automating the one or more manufacturing tools within the semiconductor manufacturing environment based on the determined allocation and processing order.

4. The method of claim 1, further comprising evaluating, for one or more blocks of the at least one BB workflow, at least one BB sub-rule or report to determine at least one operation of the set of operations to perform.

5. The method of claim 1, wherein determining the allocation of the number of lots to the one or more semiconductor devices comprises:
   creating a linear programming (LP) algorithm based on at least one BB sub-rule specified in one or more blocks of the at least one BB workflow; and using the at least one LP algorithm according to one or more criteria specified in the at least one BB rule to determine the allocation.

6. The method of claim 5, wherein the at least one LP algorithm comprises a mixed integer programming (MIP) algorithm.

7. The method of claim 2, wherein determining the processing order comprises:
evaluating one or more parameters of at least one BB sub-rule defined in one or more blocks of the at least one BB workflow, wherein the one or more parameters comprise at least one of the converted data in the second schema or a number of currently sequenced lots of the number of lots.

8. The method of claim 2, wherein executing the at least one BB workflow further comprises:
writing at least one of the extracted data, the converted data, the determined allocation, or the processing order to a storage system in the semiconductor manufacturing environment; and
upon determining an error in a generated schedule, retrieving at least one of the extracted data, the converted data, the determined allocation, or the processing order from the storage system to reproduce the error in the semiconductor manufacturing environment.

9. A non-transitory computer-readable medium containing computer program code that, when executed by a processor, performs an operation for executing a block-based (BB) workflow to provide a schedule for a semiconductor manufacturing environment, the operation comprising:
receiving at least one BB workflow comprising a plurality of blocks, wherein the plurality of blocks specify a set of operations for generating the schedule for the semiconductor manufacturing environment;
accessing a plurality of block definitions corresponding to the plurality of blocks; and
executing the at least one BB workflow by performing the set of operations based on the plurality of block definitions, comprising:
extracting data from the semiconductor manufacturing environment, wherein the data describes a number of lots available for processing and one or more manufacturing tools operating in the semiconductor manufacturing environment, and wherein each lot comprises a plurality of semiconductor substrates or a plurality of semiconductor die;
determining, based on the extracted data, an allocation of the number of lots to the one or more manufacturing tools operating in the semiconductor manufacturing environment, and an order in which the lots should be processed by the one or more manufacturing tools; and
publishing the determined allocation and processing order to at least one another manufacturing tool in the semiconductor manufacturing environment; and
operating one or more manufacturing tools in the semiconductor manufacturing environment to at least one of fabricate, package, or test one or more semiconductor devices on the plurality of semiconductor substrates or the plurality of semiconductor die according to the determined allocation and processing order.

10. The non-transitory computer-readable medium of claim 9, wherein executing the at least one BB workflow further comprises:
converting the extracted data from a first schema used by the semiconductor manufacturing environment to a second schema;
evaluating the data in at least one of the first schema or second schema for errors; and
reporting any errors to a user.

11. The non-transitory computer-readable medium of claim 9, wherein executing the at least one BB workflow further comprises automating the one or more manufacturing tools within the semiconductor manufacturing environment based on the determined allocation and processing order.

12. The non-transitory computer-readable medium of claim 9, wherein the operation further comprises evaluating, for one or more blocks of the at least one BB workflow, at least one BB sub-rule or report to determine at least one operation of the set of operations to perform.

13. The non-transitory computer-readable medium of claim 9, wherein determining the allocation of the number of lots to the one or more semiconductor devices comprises:
creating a linear programming (LP) algorithm based on at least one BB sub-rule specified in one or more blocks of the at least one BB workflow; and
using the at least one LP algorithm according to one or more criteria specified in the at least one BB rule to determine the allocation.

14. The non-transitory computer-readable medium of claim 13, the at least one LP algorithm comprises a mixed integer programming (MIP) algorithm.

15. The non-transitory computer-readable medium of claim 10, wherein determining the processing order comprises:
evaluating one or more parameters of at least one BB sub-rule defined in one or more blocks of the at least one BB workflow, wherein the one or more parameters comprise at least one of the converted data in the second schema or a number of currently sequenced lots of the number of lots.

16. The non-transitory computer-readable medium of claim 10, wherein executing the at least one BB workflow further comprises:
writing at least one of the extracted data, the converted data, the determined allocation, or the processing order to a storage system in the semiconductor manufacturing environment; and
upon determining an error in a generated schedule, retrieving at least one of the extracted data, the converted data, the determined allocation, or the processing order from the storage system to reproduce the error in the semiconductor manufacturing environment.

17. A scheduling system for a semiconductor manufacturing environment, wherein the semiconductor manufacturing environment comprises a plurality of lots and one or more tools for processing the lots, the scheduling system comprising:
at least one processor; and
a memory containing a program that, when executed by the at least one processor, performs an operation for executing a block-based (BB) workflow to provide a schedule for the semiconductor manufacturing environment, the operation comprising:
receiving at least one BB workflow comprising a plurality of blocks, wherein the plurality of blocks specify a set of operations for generating the schedule for the semiconductor manufacturing environment;
accessing a plurality of block definitions corresponding to the plurality of blocks; and executing the at least one BB workflow by performing the set of operations based on the plurality of block definitions, comprising:
   extracting data from the semiconductor manufacturing environment, wherein the data describes a number of lots available for processing and one or more manufacturing tools operating in the semiconductor manufacturing environment, and wherein each lot comprises a plurality of semiconductor substrates or a plurality of semiconductor die;
   determining, based on the extracted data, an allocation of the number of lots to the one or more manufacturing tools operating in the semiconductor manufacturing environment, and an order in which the lots should be processed by the one or more manufacturing tools; and
   publishing the determined allocation and processing order to at least one another manufacturing tool in the semiconductor manufacturing environment; and
operating one or more manufacturing tools in the semiconductor manufacturing environment to at least one of fabricate, package, or test one or more semiconductor devices on the plurality of semiconductor substrates or the plurality of semiconductor die according to the determined allocation and processing order.

18. The scheduling system of claim 17, wherein determining the allocation of the number of lots to the one or more manufacturing tools comprises:
   creating a linear programming (LP) algorithm based on at least one BB sub-rule specified in one or more blocks of the at least one BB workflow; and
   using the at least one LP algorithm according to one or more criteria specified in the at least one BB rule to determine the allocation.

19. The scheduling system of claim 18, wherein determining the lot processing order comprises:
   evaluating one or more parameters of at least one BB sub-rule defined in one or more blocks of the at least one BB workflow, wherein the one or more parameters comprise at least one of the converted data in the second schema or a number of currently sequenced lots of the number of lots.

20. The scheduling system of claim 18, wherein executing the at least one BB workflow further comprises:
   writing at least one of the extracted data, the converted data, the determined allocation, or the processing order to a storage system in the semiconductor manufacturing environment; and
   upon determining an error in a generated schedule, retrieving at least one of the extracted data, the converted data, the determined allocation, or the processing order from the storage system to reproduce the error in the semiconductor manufacturing environment.

21. The scheduling system of claim 17, further comprising:
   a display device configured to display a graphical user interface (GUI), the display device coupled to the at least one processor; and
   an input device coupled to the display and the at least one processor for permitting a user to manipulate a representation of the at least one BB workflow in the GUI, the representation comprising:
   a block panel including representations of blocks of a BB workflow; and
   a BB workflow panel, wherein the GUI permits the user to drag and drop the representations of the blocks from the block panel into the BB workflow panel, and
   wherein each representation of a block in the block panel is a logical abstraction that represents the set of operations that are configured to generate the received at least one BB workflow.

22. The scheduling system of claim 21, wherein the user can arrange the representations of blocks in the BB workflow panel in any order or configuration using the input device.

23. The scheduling system of claim 21, wherein the GUI permits the user to specify one or more properties for each representation of a block in the workflow panel.

24. The scheduling system of claim 23, wherein the one or more properties specify at least one of a data source for a block, timing of one or more operations associated with the block, and criteria associated with performing the one or more operations associated with the block.

25. The scheduling system of claim 24, wherein the one or more operations and/or the one or more properties for each block represented in the BB workflow panel are stored in one or more block definition files that the at least one processor accesses to execute each block.

26. The scheduling system of claim 21, wherein the representation further comprises a BB reports and rules panel that permits the user to configure operations for a BB report and/or rule that is useable by a block within a BB workflow.

* * * * *